(12) United States Patent
Chen

(10) Patent No.: US 6,330,023 B1
(45) Date of Patent: Dec. 11, 2001

(54) VIDEO SIGNAL PROCESSING SYSTEMS AND METHODS UTILIZING AUTOMATED SPEECH ANALYSIS

(75) Inventor: Tsuhan Chen, Middletown, NJ (US)

(73) Assignee: American Telephone and Telegraph Corporation, NY (US)

( * ) Notice: Subject to any disclaimer, the term of this patent is extended or adjusted under 35 U.S.C. 154(b) by 0 days.

(21) Appl. No.: 08/210,529

(22) Filed: Mar. 18, 1994

(51) Int. Cl.[7] .................................................. H04N 7/13
(52) U.S. Cl. ..................................... 348/14.13; 348/384.1
(58) Field of Search .............................. ; 348/13, 14, 15, 348/17, 18, 19, 384, 390, 399, 415, 439, 14.13, 399.1, 348.1; 381/36; 379/53; 358/133, 83, 85; H04N 7/13, 7/14

(56) References Cited

U.S. PATENT DOCUMENTS

| | | | |
|---|---|---|---|
| 4,841,575 | 6/1989 | Welsh et al. | ............................ 381/36 |
| 4,884,972 | 12/1989 | Gasper . | |
| 4,975,960 | 12/1990 | Petajan . | |
| 5,426,460 | * 6/1995 | Erving et al. | ............................ 348/17 |

FOREIGN PATENT DOCUMENTS

| | | | |
|---|---|---|---|
| 0274962 | * 11/1987 | (JP) | ........................................ 379/53 |
| 01162492 | * 6/1989 | (JP) . | |
| 0190187 | * 7/1989 | (JP) | ................................. H04N/7/13 |
| 0190188 | * 7/1989 | (JP) | ................................. H04N/7/13 |
| 0036687 | * 2/1990 | (JP) | ................................. H04N/7/14 |
| 0196585 | * 8/1990 | (JP) | ................................. H04N/7/14 |
| 0270390 | * 12/1991 | (JP) | ................................. H04N/7/14 |
| 0153851 | * 6/1993 | (JP) | ................................. H04N/7/14 |
| 0000951 | * 1/1994 | (WO) | ................................. H04N/7/13 |

OTHER PUBLICATIONS

Lippman, Andrew, Assistant Professor of Media Technbology, Massachusetts Institute of Technology; Semantic Bandwidth Compression: Speechmaker, Picture Coding Symposium, 1981, pp.29–30.
Yuille, Alan L., Cohen David S. and Hallinan, Peter W., Harvard Robotics Laboratory, Division of Applied Sciences, Harvard University, 1989 IEEE, Feature extraction from faces using deformable templates, Apr. 1989, pp. 104–109.
Welsh, W.J., Searby, S. and Waite, J.F., Model–Based Image Coding, pp. 194–244.
Waite, J.B. and Welsh, W.J., Head Boundary Location Using Snakes, pp. 245–265.
International Organization for Standardization Organization Internationale Normalisation ISO/IEC JTC1/SC29/WG11. Coding of Moving Pictures and Associated Audio, Nov. 5, 1992, pp. 1–18.

* cited by examiner

*Primary Examiner*—David E Harvey

(57) ABSTRACT

A method of increasing the frame rate of an image of a speaking person comprises monitoring an audio signal indicative of utterances by the speaking person and the associated video signal. The audio signal corresponds to one or more fields or frames to be reconstructed, and individual portions of the audio signal are associated with facial feature information. The facial information includes mouth formation and position information derived from phonemes or other speech-based criteria from which the position of a speaker's mouth may be reliably predicted. A field or frame of the image is reconstructed using image features extracted from the existing frame and by utilizing the facial feature information associated with a detected phoneme.

18 Claims, 2 Drawing Sheets

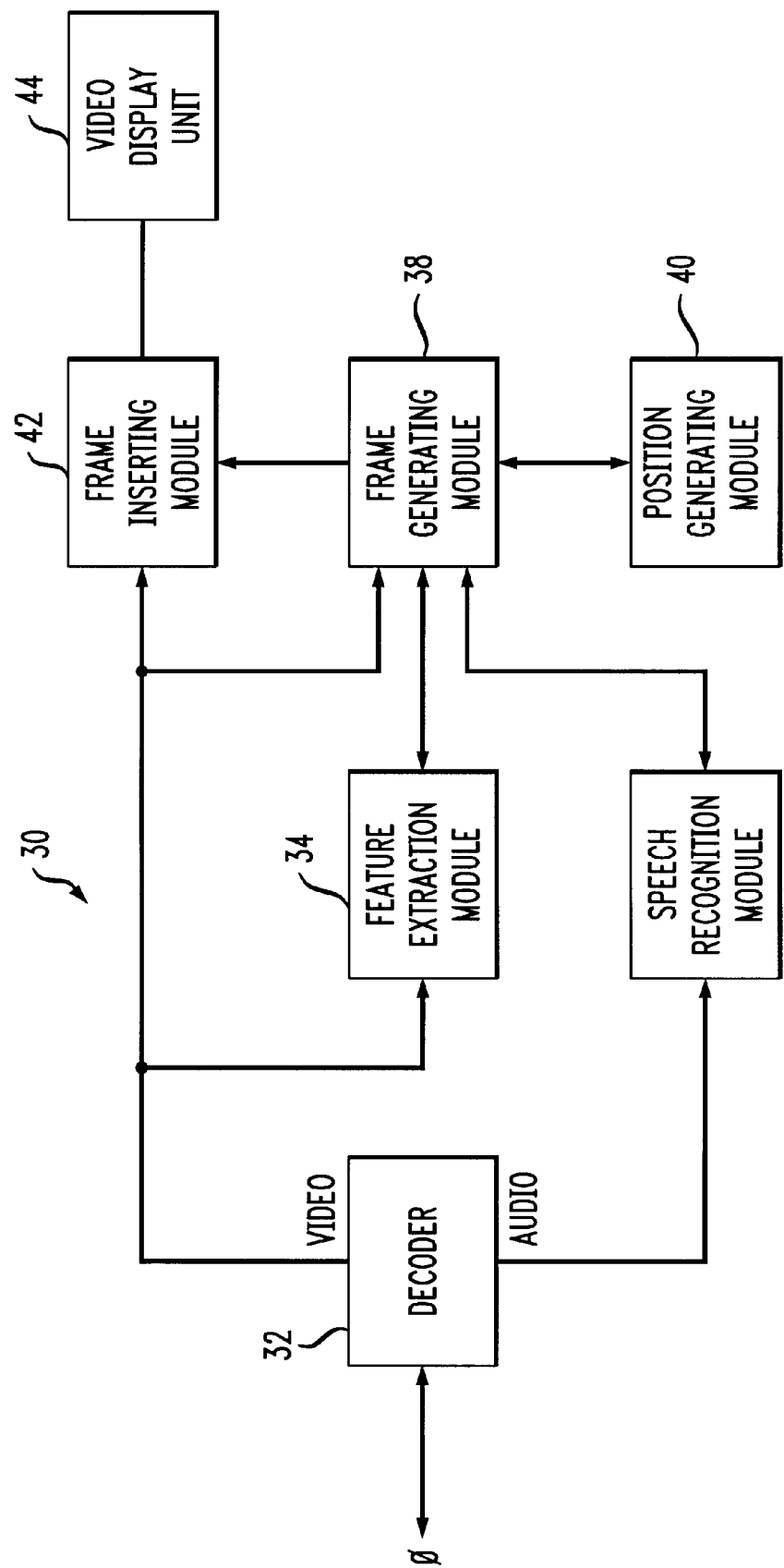

VIDEO SIGNAL PROCESSING SYSTEMS AND METHODS UTILIZING AUTOMATED SPEECH ANALYSIS

BACKGROUND OF THE INVENTION

1. Field of the Invention

This invention relates generally to processing video signals, and more specifically to systems for interpolating and coding video signals using speech analysis techniques.

2. Description of the Related Art

The progressive developments in digital electronics and digital computing since the 1960s have resulted in the conversion, from analog to digital technology, of devices for storing and processing audio and video signals. Storing, processing and transmitting signals digitally offers significant advantages. Digital signals are less sensitive to transmission noise than analog signals. Moreover, digital signals of different types can be treated in a unified way and, provided adequate decoding arrangements exist, can be mixed on the same channel. The latter approach is the main feature of the Integrated Services Digital Network (ISDN) which is currently being developed and implemented. The ISDN can handle, for example, speech, image and computer data on a single channel.

A major disadvantage of digital communication, however, is that it requires greater channel bandwidth. This can be several times the bandwidth of an equivalent analog channel. In multimedia, videotelephony, and teleconferencing applications, bandwidth and storage space limitations permit only a relatively low frame rate (typically 5–10 frames per second, but as low as 1–2 frames per second for some applications). Thus, there is currently a strong emphasis on techniques and systems which compress the channel bandwidth required to transmit the signals. In the context of speech signals, for example, a number of techniques have been proposed which are capable of efficiently coding at very low bit-rates (between 4.8 to 64 kbits/s). Such techniques include logarithmic pulse code modulation (Log PCM), adaptive pulse code modulation (APCM), adaptive differential pulse code modulation (ADPCM), delta modulation (DM), and continuously variable slope delta modulation (CVSD). All of these techniques operate directly on the time domain signal and achieve reduced bit rates by exploiting the sample to sample correlation or redundancy in the speech signal.

While the coding techniques discussed above permit very-low bit rates to be achieved for the transmission or storage of speech signals, they are less suitable for the coding of video signals. Thus, although current visual coding standards may also operate at very low bit rates, the trade-off between temporal and spatial resolution results in visually annoying motion or spatial artifacts. As such, various techniques have been proposed to interpolate between transmitted or stored frames as a means of increasing the frame rate for flicker free and smooth motion rendition.

In the interframe coding of television pictures, for example, it is known to drop or discard information from some frames or fields by subsampling the video signal at a fraction of the normal rate. At the receiver, a reconstructed version of the information contained in the nontransmitted frames or fields is obtained by interpolation, using information derived from the transmitted fields. Simple linear interpolation may be performed by averaging the intensity information defining picture elements (pels) in the preceding and succeeding transmitted fields at fixed locations most closely related to the location of the picture element being processed. In certain instances, the interpolation may be performed adaptively, such that the pels used to form certain reconstructed or estimated intensity values are selected from two or more groups having different spatial patterns or such that the information obtained from pels in the same relative spatial positions in the prior and succeeding frames are combined in two or more different ways.

Although both the fixed and the adaptive techniques described above adequately recover nontransmitted or unstored picture information when little motion occurs in a picture, their performance is less than adequate when objects in the picture are moving quickly in the field of view. That is, reconstruction by these interpolation techniques often causes blurring and other objectionable visual distortion. Thus, a more advanced interframe coding technique is proposed in U.S. Pat. No. 4,383,272 issued to Netravali et al. on May 10, 1983 and entitled VIDEO SIGNAL INTERPOLATION USING MOTION ESTIMATION. In accordance with the technique disclosed therein, information defining elements of a picture are estimated by interpolation using information from related locations in preceding and succeeding versions of the picture. The related locations are determined by forming an estimate of the displacement of objects in the picture. Displacement estimates are advantageously formed recursively, with updates being formed only in moving areas of the picture. While this coding technique is capable of eliminating the annoying distortion and flicker associated with the other prior art techniques described above, it is still incapable of reproducing the motion of a speaker's mouth in so-called talking-head (i.e. speaking-person) sequences.

Normal speech has about 13 speech sounds per second, and the positions of the lips, jaw, teeth, and tongue change at even higher rates. As such, it will be readily appreciated that at rates of 5–10 frames per second or lower, a great deal of information about mouth movements is necessarily lost. Accordingly, it is a principal object of the present invention to enable improved reconstruction of non-transmitted or non-stored fields or frames of a video signal indicative of a speaking personsequence using information from the speaking person's utterances and at least one transmitted or stored field or frame.

SUMMARY OF THE INVENTION

The foregoing and additional objects, which will hereinafter become apparent to those skilled in the art, are achieved in accordance with the present invention by a method and apparatus for increasing the frame rate of an image of a speaking person transmitted or stored at very low bitrates.

The apparatus of the present invention comprises frame generating means, responsive to an audio signal associated with an utterance by the speaking person and a frame to be reconstructed and to a video signal indicative of an existing frame or field, for generating a reconstructed frame of the image. The apparatus further includes means for associating respective portions of the audio signal with facial feature information and means for inserting a reconstructed frame between consecutive existing (i.e. stored or transmitted) frames.

The apparatus also includes monitoring means for detecting the audio signal portions, each signal portion corresponding to a speaker mouth formation. The signal portions may correspond to a phoneme, a homophene, or some other speech-based criteria from which mouth formation data can be reliably predicted. The stored facial information may include visemes, as well as feature position parameters relating to the jaw, teeth, tongue, and cheeks. Accordingly, the associating means may include a memory having stored therein a speaker-independent table of feature position parameters for respective detected signal portions. In a modified embodiment, the apparatus further includes means responsive to the monitoring means for storing speaker-dependent mouth position parameter data indicative of respective mouth positions as corresponding signal portions indicative of phonemes are detected by the monitoring means.

A method of increasing the frame rate of an image or picture of a speaking person in accordance with the present invention comprises the steps of monitoring an audio signal indicative of an utterance by the speaking person and associated with a frame to be reconstructed, monitoring a video signal indicative of an existing frame, associating individual portions of the audio signal with facial feature information, reconstructing at least one frame of the picture from the existing frame utilizing facial feature information obtained in the associating step, and inserting a reconstructed frame obtained during the reconstructing step between consecutive existing frames of the picture.

The monitoring step includes monitoring the audio signal to sequentially detect respective signal portions, each signal portion corresponding to a speaker mouth position. A sequence of frames is thus reconstructed, with reconstructed frames depicting respective positions of the speaker's mouth. In accordance with one embodiment of the method of the present invention, the associating step comprises addressing stored values associated with each signal portion detected during the monitoring step. The stored values comprise speaker independent facial feature position parameter data such, for example, as the mouth formation. In a modified embodiment, the method further includes a step of monitoring speech signals to detect signal portions during existing frames or fields and storing speaker-dependent mouth position parameter data associated with each of the detected signal portions.

In accordance with another aspect of the present invention, a system of coding video signals includes monitoring an audio signal indicative of an utterance by the speaking person and associated with a frame to be discarded and a video signal indicative of a frame to be transmitted or stored, associating individual portions of the audio signal with facial feature information and calculating a plurality of motion vectors which are used for motion compensation. The difference between the frame to be discarded and the frame to be transmitted is sent to a decoder along with a representation of a frame to be transmitted or stored, thereby permitting a substantially lower expenditure of bits.

Many applications of the present invention are possible. For example, a video teleconferencing apparatus for transmitting and receiving digital audio and video data signals may comprise means for receiving very-low bitrate video and audio signals (e.g., between 4–40 kbps) indicative of a speaking person, frame generating means responsive to an audio signal portion associated with a frame to be reconstructed and to a video signal portion indicative of an existing frame or field for reconstructing a frame of said picture, means for associating respective portions of the audio signal with facial feature information, means for inserting a frame reconstructed by the generating means between consecutive received frames or fields to form a higher frame rate sequence, and means for displaying said higher frame rate sequence.

In accordance with yet another aspect of the present invention, a method of coding video signals comprises the steps of receiving an input video image sequence depicting a speaking person, analyzing an audio speech signal associated with the input image sequence to detect utterance segments indicative of respective mouth formations of the speaker, and generating a bit stream indicative of the input video image sequence in accordance with mouth formations detected during the analyzing step.

The various features of novelty which characterize the invention are pointed out with particularity in the claims annexed to and forming a part of the disclosure. For a better understanding of the invention, its operating advantages, and specific objects attained by its use, reference should be had to the accompanying drawing and descriptive matter in which there are illustrated and described several currently preferred embodiments of the invention.

BRIEF DESCRIPTION OF THE DRAWINGS

The features and advantages of the present invention will be more readily understood from the following detailed description when read in conjunction with the accompanying drawings, in which:

FIG. 2 is a block diagram depicting the various elements of a videophone apparatus which represents one application of speech assisted video frame sequence interpolation in accordance with the present invention.

DETAILED DESCRIPTION OF THE PREFERRED EMBODIMENTS

Figure 1:
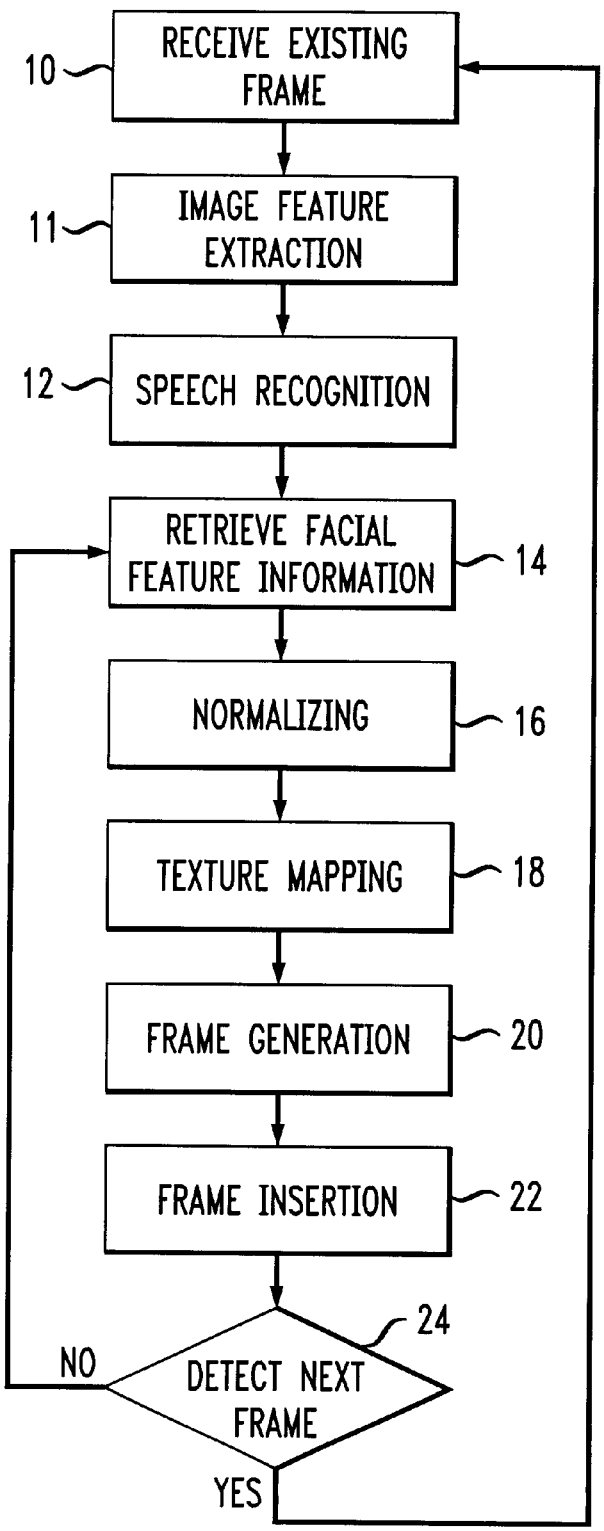
FIG. 1 is a flowchart depicting the various steps of an illustrative embodiment of the speech assisted video frame sequence interpolation process of the present invention.

As indicated above, it is a principal objective of the present invention to permit reconstruction of a non-transmitted field or frame of a video signal using information derived from a transmitted preceding signal. In the case of previously stored signals (i.e., non real-time interpolation), the following frame of the video signal may also be used to further enhance the accuracy of the reconstruction process. In any event, as is well known by those skilled in the art, the scan lines in each pair of successive fields may be interlaced to conserve bandwidth. Accordingly, where the term "frame" is utilized herein, it should be understood to refer, in the alternative, to a field. It is submitted that the use of audio signal analysis to assist in the coding or decoding of video signals is a novel concept with a wide range of possible applications.

In FIG. 1, block 10 indicates the receipt of an existing frame of a speaking person picture sequence. The existing frame may be received, for example, as a very low-bitrate (64 kbps or less) transmission from a videotelephone device. Alternatively, the existing frame may be obtained by accessing a previously stored picture sequence sampled at a relatively low rate (5–10 frames/sec or less). In any event, as indicated in block 11, an initial model of the face of the speaking person is obtained from the existing frame in accordance with a suitable image feature extraction algorithm such for example, as the 3-D facial model described in a paper presented by Shigeo Moroshima et al. at the 1989 ICASSP in Glasgow, U.K. entitled "An Intelligent Facial Image Coding Driven by Speech and Phoneme", the disclosure of which is expressly incorporated herein by reference. In accordance with the illustrative embodiment, a two-dimensional wire frame model is employed. Essentially, the geometric surface of the face is described as a collection of polygons (e.g. triangles). During feature extraction, the transmitted or stored frame is analyzed to determine the positions and critical dimensions corresponding to facial features, such as the lips, eyes, and jaw, which predictably vary during speaking.

In accordance with the present invention, at least one frame to be inserted is reconstructed using the parametric facial model obtained in block 11. As will be explained in detail later, this is achieved by analyzing the audio signal indicative of the utterances of a speaking person depicted in the frame. Initially, it should be emphasized that if there are multiple speakers, precise speaker identification both for the audio signal and the video sequence must be performed to produce correct interpolation results. For purposes of clarity, the description herein will be confined to the single speaker case.

In any event, as shown in block 12, the audio signal associated with a non-stored or non-transmitted sequence of frames is analyzed in accordance with a conventional speech recognition circuit. As will soon become apparent, the recognition to be performed need not be full context-level recognition. Thus, in an illustrative embodiment of the present invention, the audio signal is analyzed to break down the speaker's utterance(s) into a sequence of phonemes. As hereinafter explained, these phonemes can be mapped into distinct, visible mouth shapes known as visemes. In a still further simplified embodiment of the present invention, the audio signal is analyzed to identify a sequence of homophenes contained in the utterance. Essentially, a homophene is a set of phonemes that are produced in a similar manner by the speaker such that the positions of the lips, teeth, and tongue are visually similar to an observer. Of course, if a higher degree of performance is required, context level speech recognition may be performed and the phoneme information extracted therefrom.

In accordance with the present invention, frames to be inserted after the first frame are reconstructed by modifying the parametric facial model obtained from the first frame utilizing the phoneme data obtained by speech recognition. This is achieved by addressing or consulting a look-up table containing parametric position data corresponding to each viseme, as indicated in block 14. The detail of the information contained in the look-up table will, of course, vary with the particular facial modeling technique being employed. For example, if a basic morphing technique is employed, the look up table need only contain information relating to particular facial features, such as lip, teeth, and eye positions for each viseme.

The mouth positions that people use to pronounce each phoneme are generally speaker-dependent. Accordingly, the look-up table utilized in block 14 may contain normalized, speaker-independent facial feature information. In this event, reconstruction of a non-stored or non-transmitted frame requires "re-normalization" of the stored feature information to that obtained from the first frame (transmitted or stored) by image feature extraction, as shown in block 16. Normalization merely requires determining the position of selected feature points of each relevant facial feature of the speaker and scaling the corresponding look-up table position parameter data accordingly. The location of such feature points about the mouth, for example, is described in the Morishima et al. reference discussed above and incorporated herein.

As shown at block 18, once a first phoneme is identified from the audio signal and the stored speaker-independent facial features corresponding thereto are normalized, texture mapping of facial reflectance data acquired from the first frame is performed to reconstruct a frame indicative of the speaker uttering the phoneme. Essentially, texture mapping techniques are well known in the art, and include interpolating texture coordinates using an affine transformation. For an in-depth discussion of one such technique, reference may be had to a paper by H. Choi et al. entitled "Analysis and Synthesis of Facial Expressions in Knowledge-Based Coding of Facial Image Sequences", *International Conference on Acoustics Speech and Signal Processing,* pp. 2737–2740 (1991).

As indicated at block 20, a frame is generated by modifying the image corresponding to the existing frame in accordance with the normalized facial feature information. A frame generated in this manner is then inserted (block 22) between existing frames utilizing a conventional video signal generating means. In the case of a video teleconferencing device, the high frame rate output signal is supplied to a video display device for real-time display. As will be readily ascertained by those skilled in the art, a sequence of non-transmitted or non-stored frames may be inserted between transmitted or stored frames by recursively associating a detected audio signal portion indicative of a phoneme or homophene with one or more sets of speaker-independent facial feature position parameters (e.g., a viseme). Thus, as indicated at block 24, frame generation may be performed repetitively until the next existing frame is detected in the low bitrate audio signal.

Although visemes may be modelled as speaker-independent for the purposes of the present invention, it is also possible to enhance the performance of the inventive frame reconstruction process. Thus, in a modified embodiment, a default look-up table containing speaker-independent viseme data, as described above, is utilized initially. While the speaker is talking, a speaker-dependent look-up table is derived and constructed through analysis of the audio signal portions that are indicative of phonemes and that correspond to transmitted or stored frames. Each time that a new phoneme corresponding to a transmitted or stored frame is detected, feature extraction is performed on the frame image and new feature position parameters are stored. For more realistic reconstruction, the utterances of the speaker may be further analyzed to discern certain corresponding facial expressions as of sadness, happiness, or surprise. Although such techniques are still the subject of research, it is contemplated that the storage of parametric facial expression information associated with recognizable speech parameters should make it possible to achieve highly realistic video signal interpolation.

It will be recalled that in the embodiment depicted in FIG. 1, facial feature parameters were modeled in accordance with a basic morphing technique. It will, of course, be understood by those skilled in the art that a wide variety of computer-graphic techniques may be employed to produce the frames to be inserted from the existing frames and position parameters. For example, to produce more natural mouth movements, 3-D human face modeling may be utilized. For a description of one such a technique, reference may be had to the aforementioned paper by S. Morishima et al.

An illustrative videophone system 30 which utilizes the speech assisted interpolation technique of the present invention is depicted in FIG. 2. Although the particular configuration depicted in FIG. 2 is that of a videophone, it will be understood that the present invention may be utilized in any situation in which it is desired to increase the frame rate of a video sequence. As shown in FIG. 2, video and audio signals are received by system 30 via a decoder module 32. Decoder module 32 may be implemented in accordance with the CCITT SG XV H.261 64 kbps video codec standard and is adapted to decode and separate the audio and video signals received from a remote source.

A feature extraction module 34 receives the video signal and performs image feature extraction on the transmitted frames represented thereby in the manner discussed above. Meanwhile, speech recognition module 36, which may comprise a conventional speech recognition circuit, analyzes the audio signal to identify the phonemic or homophenic content from which appropriate visemes and other facial information of the speaker occurring between transmitted frames can be reliably predicted.

As discussed above, when a particular phoneme or homophene is detected by module 36, frame generating module 38 addresses position generating module 40 to obtain facial position parameter data indicative of facial features such as mouth formations (visemes), eye, cheek, and jaw positions, and the like which correspond to features of a person uttering the detected phoneme or homophene. As indicated above, the facial feature information need not be limited to speaker-independent facial feature position parameters and may, in fact, include information dynamically obtained or developed by monitoring the phonemic content of the audio signal accompanying the transmitted frames.

Frame inserting module 42, which may be configured as a conventional video signal generator, receives the existing low frame rate video signal from decoder module 32 and a video signal indicative of one or more reconstructed frames generated by frame generating module 38. The respective video signals may be processed in a conventional manner to obtain a high frame rate video output signal that is fed to a video display unit 44.

It will be readily appreciated by those skilled in the art that a wide variety of modifications may be utilized to even further enhance the quality of video interpolation accorded by the present invention. For example, speech-assisted video interpolation may be combined with motion-compensated interpolation techniques such as that disclosed in U.S. Pat. No. 4,383,272 to Netravali et al., discussed above. Motion compensated interpolation techniques themselves may be still further enhanced in accordance with another aspect of the present invention by performing speech assisted coding of video signal. As indicated above, high number of speech sounds and associated mouth movements per second of speech make it difficult, if not impossible, to accurately predict the mouth movements of the speaker. Thus, in accordance with this further aspect of the invention, the speech signal can be analyzed at the coder end and utilized to achieve a much more accurate prediction of motion vectors than would otherwise be obtainable by motion compensated interpolation alone.

For example, if it is determined that the speaker is articulating a given phoneme, the prediction of motion vectors for a non-transmitted frame normally supplied by the motion compensation technique is modified in accordance with facial feature information associated with the detected phoneme. As such, it is possible to achieve a much lower prediction error and therefore requires less bits to be expended for transmission to the decoder.

Still further enhancement of video signal interpolation in accordance with the present invention may be achieved by a suitable smoothing technique. Smoothing techniques are well known by those skilled in the art and essentially involve an averaging step over two or more fields or frames to achieve a more natural movement from one field or frame to the next. By way of example, in a smoothing technique involving three frames in which the second frame of a sequence is a transmitted frame, a weighted average is assigned to each of the three frames and the third frame (reconstructed in the manner discussed above) is modified in accordance therewith. As will be readily appreciated by those skilled in the art, any suitable smoothing algorithm may be employed and the aforementioned example is provided for purposes of illustration only.

From the foregoing, it should be readily ascertained that the invention is not limited by the embodiments described above which are presented as examples only but may be modified in various ways within the intended scope of protection as defined by the appended patent claims.

What is claimed is:

1. An apparatus for increasing the frame rate of a received video signal representative of a sequence of images of a speaking person and having a first frame rate, comprising:

a monitoring system for monitoring an audio signal temporally corresponding to the sequence of images to detect speech segments uttered by the speaking person, at least some detected speech segments corresponding to images of the image sequence that are not represented by the received video signal;

an associating system for associating detected speech segments with stored parametric mouth formation data; and a frame generating system, responsive to said monitoring system and said associating system, for generating at least one synthesized frame representative of an image of the speaking person and for inserting said at least one synthesized frame between adjacent frames of the received video signal to thereby provide a video signal having a frame rate higher than said first frame rate.

2. The apparatus according to claim 1, wherein each detected speech segment corresponds to a respective mouth formation represented by said parametric mouth formation data.

3. The apparatus according to claim 1, wherein each detected speech segment is a phoneme.

4. The apparatus according to claim 1, wherein each detected speech segment is a homophene.

5. The apparatus according to claim 2, wherein said parametric mouth formation data comprises visemes.

6. The apparatus according to claim 2, wherein said associating system includes a memory having stored therein a table of mouth formation parameters, said mouth formation parameters representing mouth shapes of a generic human speaker uttering predetermined speech segments.

7. The apparatus according to claim 1, wherein said associating system includes feature extraction means responsive to said monitoring system for extracting mouth formation parameters from frames of said received video signal as speech segments are detected by said monitoring system, each stored mouth formation parameter being representative of the mouth shape of the speaking person uttering a predetermined speech segment.

8. The apparatus according to claim 1, wherein said frame generating system is operative to synthesize a plurality of frames for insertion between adjacent frames of the received video signal.

9. The apparatus according to claim 1, wherein said associating system is operative to associate detected speech segments uttered by the speaking person with stored shapes of at least one of the jaw, tongue, and teeth of the speaking person.

10. A method of increasing the frame rate of a received video signal representative of a sequence of images of a speaking person and having a first frame rate, comprising the steps of:

monitoring an audio signal temporally corresponding to the sequence of images to detect speech segments uttered by the speaking person, at least some detected speech segments corresponding to images of the image sequence that are not represented by the received video signal;

associating a detected speech segment with stored parametric mouth formation data;

synthesizing, from at least one frame of the received video signal and parametric mouth formation data identified during said associating step, a frame representative of an image of the speaking person; and inserting a frame obtained during said synthesizing step between adjacent frames of the received video signal to thereby obtain a second video signal having a frame rate higher than said first frame rate.

11. The method of claim 10, wherein a plurality of frames are sequentially synthesized during said synthesizing step, said plurality of sequentially synthesized frames representing images of the speaking person while making said utterances.

12. The method of claim 10, wherein each detected speech segment is a phoneme.

13. The method of claim 10, wherein each detected speech segment is a homophene.

14. The method according to claim 10, wherein said associating step comprises addressing a stored table of parametric facial feature data containing mouth formation parameters, said mouth formation parameters representing mouth shapes of a generic speaker uttering predetermined speech segments.

15. A video teleconferencing apparatus for transmitting and receiving digital audio and video data signals, comprising:

means for receiving very low frame rate video and audio signal representative of a sequence of images of a speaking person and of temporally corresponding utterances of the speaking person, respectively;

frame generating means responsive to an audio signal portion temporally corresponding to an image of the sequence not represented by the low frame rate video signal and to a video signal portion indicative of at least one frame for synthesizing a frame representative of an image of the speaking person;

means for associating respective portions of said audio signal with stored facial feature information;

means for inserting a frame synthesized by said generating means between consecutive received frames of said low frame rate video signal to form a higher frame rate sequence; and means for displaying said higher frame rate sequence.

16. The apparatus according to claim 1, wherein said first frame rate is less than ten frames per second.

17. The apparatus according to claim 10, wherein said first frame rate is less than ten frames per second.

18. The apparatus according to claim 1, further comprising feature extraction means responsive to the received video signal for extracting parametric mouth formation data from a plurality of frames thereof.

* * * * *